(12) United States Patent
Suzuki

(10) Patent No.: US 11,810,442 B2
(45) Date of Patent: *Nov. 7, 2023

(54) DEVICE FOR MONITORING A SHOPPING CART

(71) Applicant: TOSHIBA TEC KABUSHIKI KAISHA, Tokyo (JP)

(72) Inventor: Kota Suzuki, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 198 days.

This patent is subject to a terminal disclaimer.

(21) Appl. No.: 17/341,843

(22) Filed: Jun. 8, 2021

(65) Prior Publication Data

US 2021/0295672 A1  Sep. 23, 2021

Related U.S. Application Data

(63) Continuation of application No. 16/516,090, filed on Jul. 18, 2019, now Pat. No. 11,043,104.

(30) Foreign Application Priority Data

Oct. 24, 2018  (JP) ................................ 2018-200130

(51) Int. Cl.
*G08B 21/00* (2006.01)
*G08B 21/24* (2006.01)
(Continued)

(52) U.S. Cl.
CPC ........... *G08B 21/24* (2013.01); *G06Q 20/202* (2013.01); *G08B 21/182* (2013.01)

(58) Field of Classification Search
CPC ..... G08B 21/24; G08B 21/182; G06Q 20/202
See application file for complete search history.

(56) References Cited

U.S. PATENT DOCUMENTS 5,455,560 A  10/1995  Owen
5,939,981 A   8/1999  Renney
(Continued)

FOREIGN PATENT DOCUMENTS

JP   2015-038673 A   2/2015
WO   WO-99/26185 A1  5/1999
(Continued)

OTHER PUBLICATIONS

Extended European Search Report issued in corresponding EP Application No. 19193128.6 dated Feb. 26, 2020, (9 pages).
(Continued)

*Primary Examiner* — Hongmin Fan
(74) *Attorney, Agent, or Firm* — FOLEY & LARDNER LLP

(57) ABSTRACT

A monitoring device according to an embodiment determines whether an information terminal, which moves together with a purchaser and receives data input regarding commodities for purchase by the purchaser, is present in a second place different from a set first place. The monitoring device detects that the information terminal is left unattended in the second place. The monitoring device activates an alarm in response to the information terminal being left unattended in the second place for a threshold period of time.

6 Claims, 12 Drawing Sheets

(51) Int. Cl.
*G06Q 20/20* (2012.01)
*G08B 21/18* (2006.01)

(56) References Cited

U.S. PATENT DOCUMENTS

| | | | |
|---|---|---|---|
| 5,999,799 | A | 12/1999 | Hu et al. |
| 9,520,250 | B2 | 12/2016 | O'Keeffe |
| 2001/0028301 | A1 | 10/2001 | Geiger et al. |
| 2005/0040229 | A1 | 2/2005 | Andrews et al. |
| 2006/0200378 | A1 | 9/2006 | Sorensen |
| 2008/0011836 | A1 | 1/2008 | Adema et al. |
| 2009/0058640 | A1 | 3/2009 | Vantorre |
| 2009/0153322 | A1 | 6/2009 | Gough |
| 2012/0227103 | A1 | 9/2012 | Itagaki et al. |
| 2013/0257000 | A1 | 10/2013 | Hannah et al. |
| 2014/0091925 | A1 | 4/2014 | Luder Moody |
| 2014/0350851 | A1 | 11/2014 | Carter et al. |
| 2015/0154847 | A1 | 6/2015 | Oliver et al. |
| 2015/0156567 | A1 | 6/2015 | Oliver et al. |
| 2015/0325103 | A1 | 11/2015 | Ngyuen et al. |
| 2016/0022393 | A1 | 1/2016 | Yoshida et al. |
| 2016/0088438 | A1 | 3/2016 | O'Keeffe |
| 2017/0225701 | A1 | 8/2017 | Kraus et al. |
| 2018/0075721 | A1 | 3/2018 | Oliver et al. |
| 2018/0349953 | A1* | 12/2018 | Tian ................... G06Q 30/0255 |
| 2019/0139066 | A1 | 5/2019 | Bryan et al. |
| 2019/0178010 | A1 | 6/2019 | Moock et al. |
| 2019/0263644 | A1 | 8/2019 | Atchley et al. |

FOREIGN PATENT DOCUMENTS

| | | |
|---|---|---|
| WO | WO-2008/118906 A2 | 10/2008 |
| WO | WO-2017/065187 A1 | 4/2017 |

OTHER PUBLICATIONS

Non-Final Office Action on U.S. Appl. No. 16/516,090 dated Feb. 7, 2020.
Non-Final Office Action on U.S. Appl. No. 16/516,090 dated Jul. 23, 2020.
Notice of Allowance on U.S. Appl. No. 16/516,090 dated Mar. 4, 2021.
Notice of Reasons for Refusal dated Jul. 5, 2022 issued in JP Application No. 2018-200130, with English translation, 10 pages.

* cited by examiner

DEVICE FOR MONITORING A SHOPPING CART

CROSS-REFERENCE TO RELATED APPLICATIONS

This application is a continuation of U.S. application Ser. No. 16/516,090 filed Jul. 18, 2019, which is based upon and claims the benefit of priority from Japanese Patent Application No. 2018-200130, filed Oct. 24, 2018, the entire contents of each of which are incorporated herein by reference.

FIELD

Embodiments described herein relate generally to a monitoring device and a monitoring program.

BACKGROUND

In recent years, a cart Point Of Sales (POS) system has been proposed for stores equipped with shopping carts. In the system, an information terminal including a touch panel and a scanner is provided in the shopping cart. If placing a purchased commodity on the shopping cart, a customer using the cart causes the scanner to read an identification code of the purchased commodity and performs commodity registration. Data of the commodity registered by the information terminal is sent to an accounting machine. The accounting machine executes accounting processing based on the data sent from the information terminal. In this way, in the cart POS system, the customer himself or herself performs the commodity registration while performing shopping. Therefore, there are advantages that, for example, labor and time of a store clerk for performing commodity registration in an accounting area can be eliminated.

However, in the cart POS system of this type, if the customer leaves the shopping cart in a selling area or the like and moves away from the place, as a result, the information terminal is left unattended. The information terminal left unattended is likely to be illegally used by an outsider. Therefore, there is a demand for preventing the information terminal from being left unattended as much as possible.

Related art is described in, for example, JP-A-2012-183899.

DETAILED DESCRIPTION

An object of embodiments is to provide a monitoring device that can prevent an information terminal from being left unattended as much as possible.

According to an embodiment, a monitoring device includes a determining section, a detecting section, and an alarm section. The determining section determines whether an information terminal is present in a second place different from a set first place, the information terminal moving together with a purchaser and receiving data input of a commodity purchased by the purchaser. The detecting section detects that the information terminal is left unattended in the second place. The alarm section emits an alarm if the information terminal is left unattended in the second place.

An embodiment of a monitoring device that can prevent an information terminal from being left unattended as much as possible is explained with reference to the drawings. In this embodiment, in a cart POS system, a function of a monitoring device is applied to an information terminal provided in a shopping cart.

Figure 1:
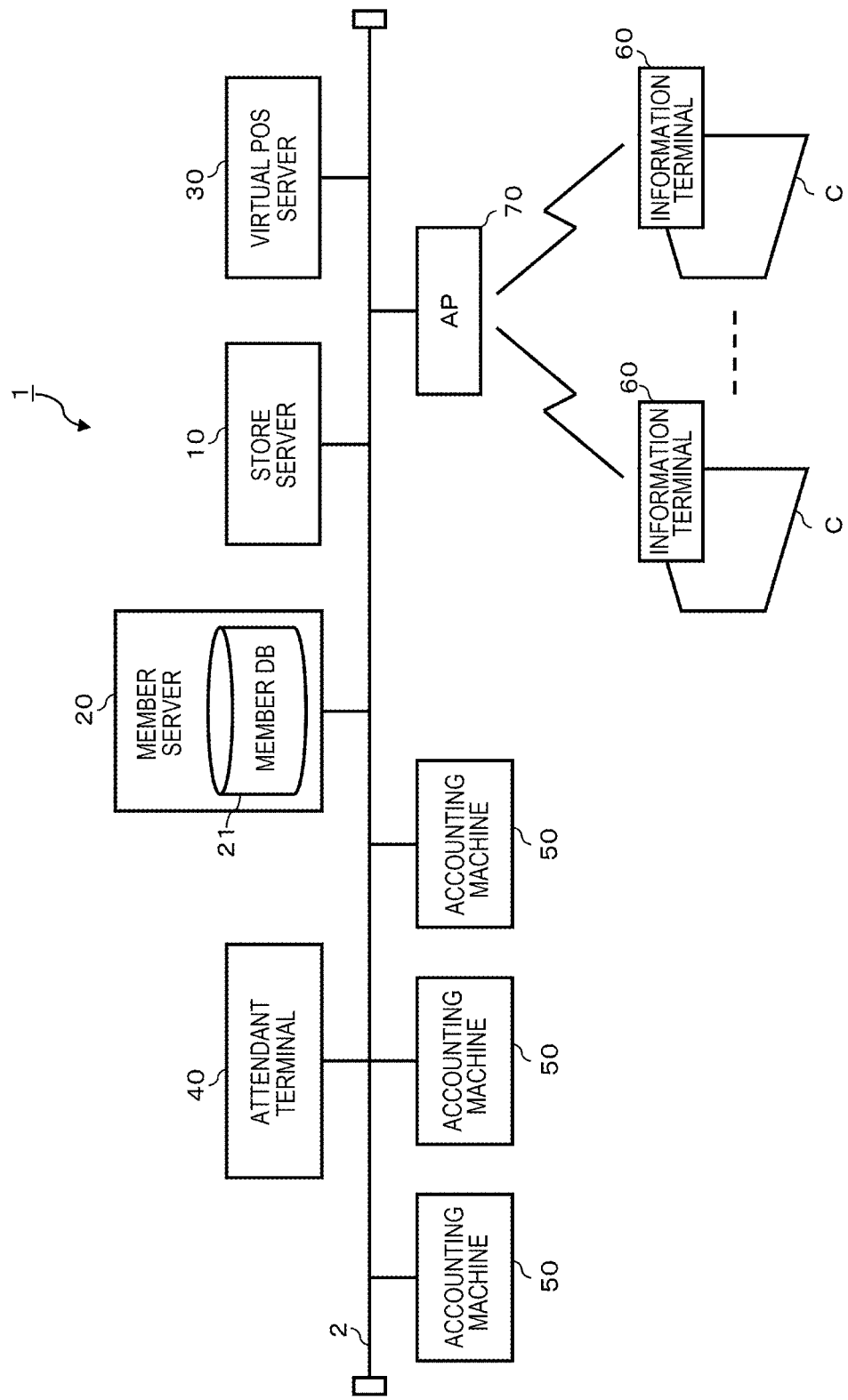
FIG. 1 is an overall configuration diagram of a cart POS system according to an embodiment.
Figure 2:
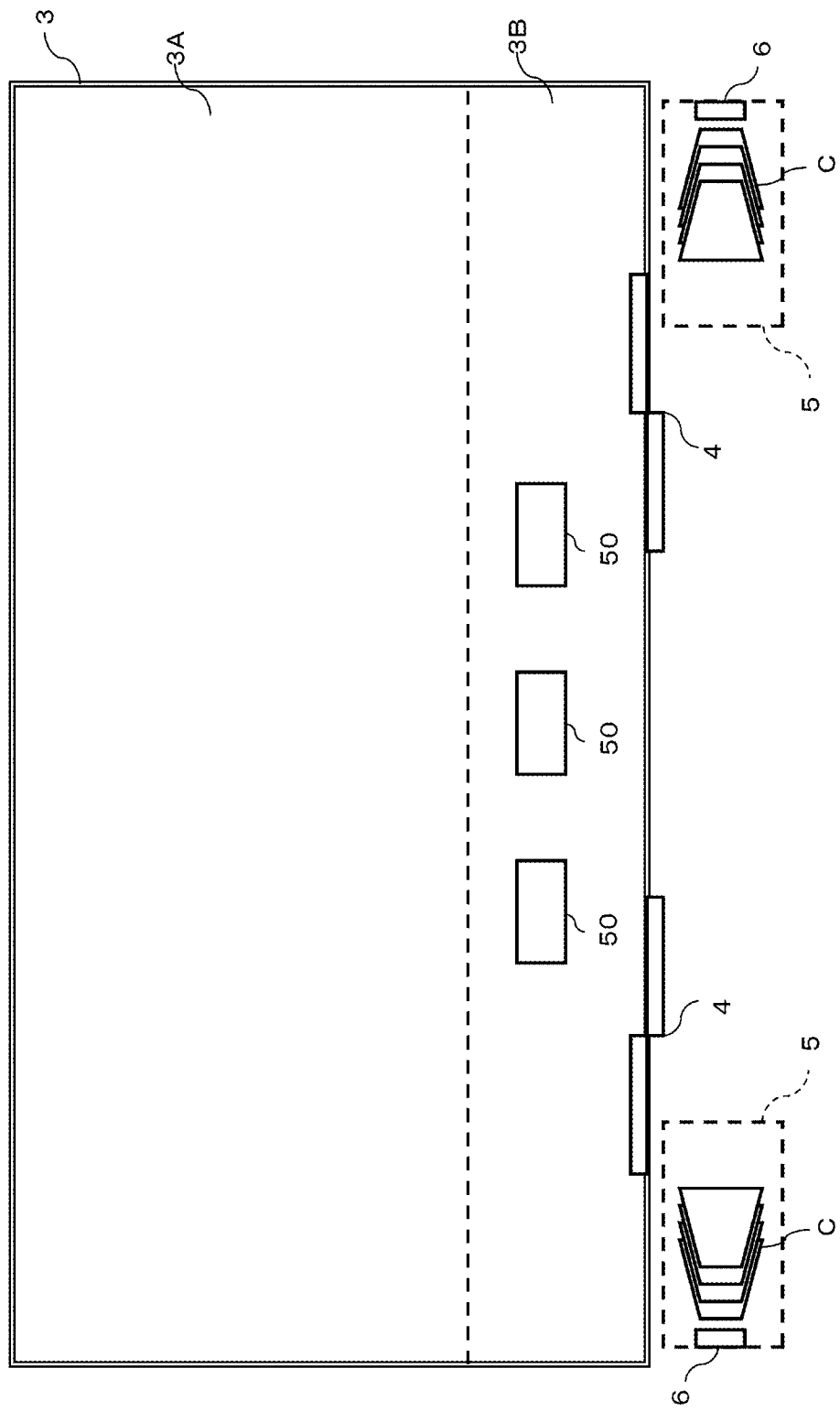
FIG. 2 is a schematic diagram illustrating a layout example of a store in which the cart POS system is configured.

FIG. 1 is an overall configuration diagram of a cart POS system 1 according to this embodiment. FIG. 2 is a schematic diagram illustrating a layout example of a store in which the cart POS system 1 is configured. As illustrated in FIG. 1, the cart POS system 1 includes a store server 10, a member server 20, a virtual POS server 30, an attendant terminal 40, accounting machines 50, information terminals 60, and an access point 70. The store server 10, the member server 20, the virtual POS server 30, the attendant terminal 40, the accounting machines 50, and the access point 70 are connected to a network 2 such as a Local Area Network (LAN).

The information terminal 60 is a device that enables a customer, who is a purchaser, to perform data input related to registration of purchased commodities by himself or herself. The information terminal 60 is provided in a shopping cart C. In the following explanation, the shopping cart C is simply referred to as cart C. The information terminals 60 are respectively provided in a plurality of carts C. The cart C is an example of a device that stores and transports purchased commodities of a customer, who is a user of the cart C.

The information terminal 60 includes a wireless unit. The information terminal 60 performs wireless communication with the access point 70. The access point 70 relays communication between the devices connected to the network 2, that is, the store server 10, the member server 20, the virtual POS server 30, the attendant terminal 40, and the accounting machines 50 and the information terminals 60. Only one access point 70 is illustrated in FIG. 1. However, two or more access points 70 may be present depending on the size and the like of a store.

The accounting machine 50 is a device that enables a store clerk or a customer to perform accounting of purchased commodities. The accounting machine 50 is a well-known self-type POS terminal. The accounting machine 50 may be a well-known counter-type POS terminal. The number of accounting machines 50 is not particularly limited. In FIG. 1, the cart POS system 1 in which three accounting machines 50 are set in one store is illustrated.

As illustrated in FIG. 2, a store 3 is divided into a selling area 3A where commodities are displayed and an accounting area 3B where the accounting machines 50 are set. Cart storage areas 5 are provided as spaces for placing the carts C not in use. In an example illustrated in FIG. 2, the cart storage areas 5 are respectively provided on the outer sides of doorways 4 in two places of the store 3. Therefore, a customer visiting the store takes out the cart C from the cart storage area 5 and enters the store 3 through the doorway 4. The customer moves around the selling area 3A together with the cart C and puts purchased commodities in the cart C. At that time, the customer performs registration of the purchased commodities using the information terminal 60. The customer finishing the shopping moves to the accounting area 3B and performs accounting using the accounting machine 50. The customer himself or herself may perform the accounting or a store clerk may perform the accounting. The customer finishing the accounting exits the store 3 through the doorway 4 and returns the cart C to the cart storage area 5. Setting places of the cart storage areas 5 are not limited to the vicinities of the doorways 4. For example, a corner of a parking lot may be used as the cart storage area 5.

Transmitters 6 are provided in the cart storage areas 5. On the other hand, as explained below, receivers 610 are provided in the information terminals 60. The transmitters 6 repeatedly transmit radio waves at a fixed cycle, for example, like a beacon. The intensity of the radio wave is intensity for enabling the receivers 610 of the information terminals 60 attached to the carts C placed in the cart storage areas 5, where the transmitters 6 are provided, to receive the radio wave. The transmitters 6 set the cart storage areas 5 and the vicinities around the cart storage areas 5 as wireless communication regions. Setting places of the transmitters 6 are not particularly limited. In short, the setting places only have to be places where the cart storage areas 5 and the vicinities of the cart storage areas 5 are the wireless communication regions.

Referring back to FIG. 1, the store server 10 supports store jobs. For the support, the store server 10 manages a commodity database, a sales database, and the like. The commodity database saves a commodity record in which commodity data is described for each of the commodities sold in the store. The commodity data includes a commodity code, a price, and a commodity name. The commodity code is an identification code of a commodity. The sales database saves a sales record in which sales data is described for each item such as a commodity, a department, a time period, a date, a week, and a month. The sales data includes the number of sold items and a sales amount. The store server 10 also has a function of a mail server that transmits and receives electronic mail.

The member server 20 supports a purchase job of a customer who has member registration, a so-called member. For the support, the member server 20 manages a member database 21. The member database 21 saves a member record 21R in which member data is described for each of members.

Figure 3:
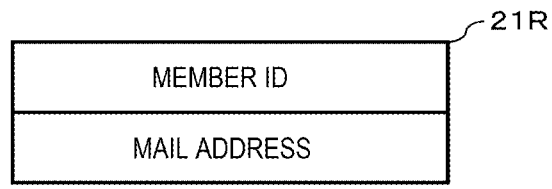
FIG. 3 is a schematic diagram illustrating a main data structure of a member record saved in a member database.

FIG. 3 is a schematic diagram illustrating a main data structure of the member record 21R. As illustrated in FIG. 3, the member record 21R includes a member ID and a mail address. The mail address is an address for electronic mail receivable by a wireless communication terminal such as a smartphone carried by a member identified by the member ID. A form of the electronic mail may be any form. In short, mail only has to be able to be transmitted to the wireless communication terminal through a network such as the Internet.

Referring back to FIG. 1, the virtual POS server 30 cooperates with the information terminal 60 to perform support for showing if the information terminal 60 is functioning as a POS terminal. The attendant terminal 40 is provided in an attendant counter where a watchman, a so-called attendant is stationed. The attendant terminal 40 includes a display device for displaying states of the information terminals 60 and the accounting machines 50. The attendant monitors, on a real-time basis, the states of the information terminals 60 and the accounting machines 50 from information displayed on the display device.

Figure 4:
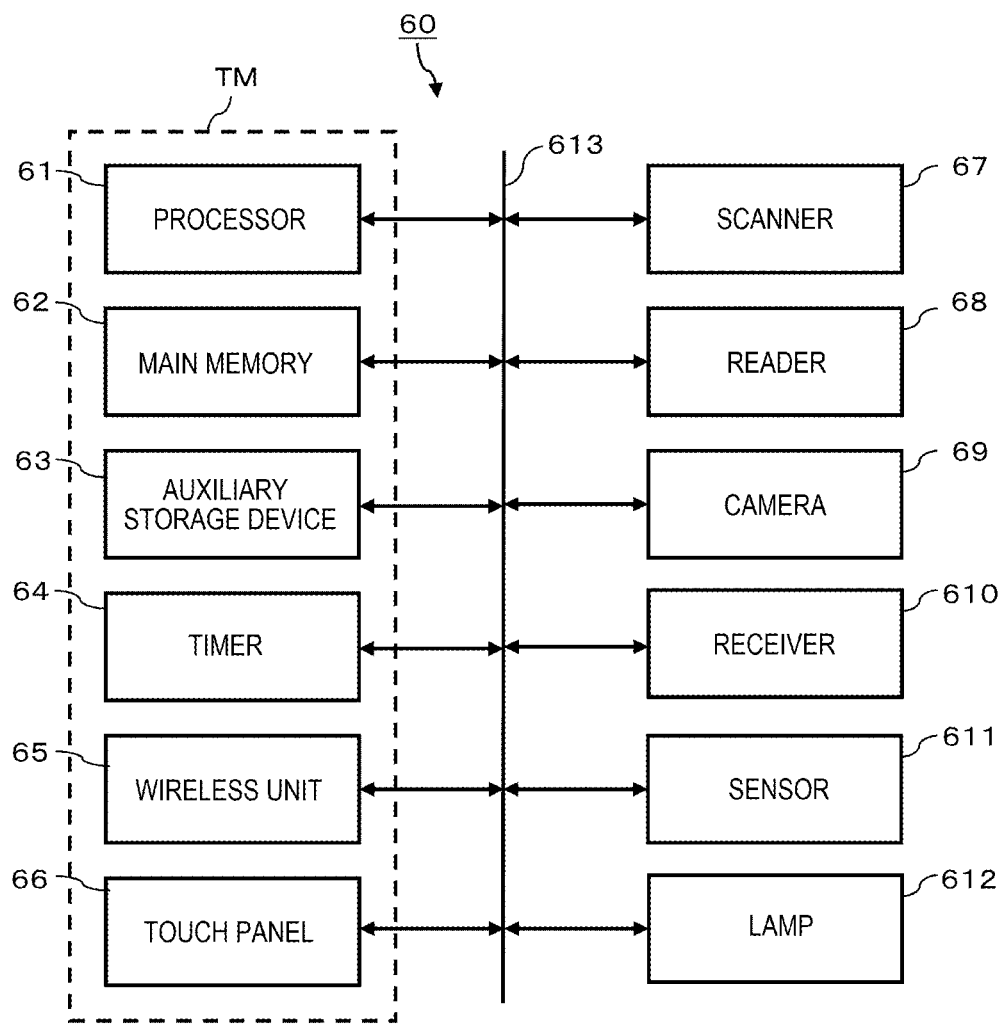
FIG. 4 is a block diagram illustrating a main part circuit configuration of an information terminal.

FIG. 4 is a block diagram illustrating a main part circuit configuration of the information terminal 60. The information terminal 60 includes a processor 61, a main memory 62, an auxiliary storage device 63, a timer 64, a wireless unit 65, a touch panel 66, a scanner 67, a reader 68, a camera 69, a receiver 610, a sensor 611, a lamp 612, and a system transmission line 613. The system transmission line 613 includes an address bus, a data bus, and a control signal line. In the information terminal 60, the processor 61, the main memory 62, the auxiliary storage device 63, the wireless unit 65, the touch panel 66, the scanner 67, the reader 68, the camera 69, the receiver 610, the sensor 611, and the lamp 612 are connected to the system transmission line 613. In the information terminal 60, a computer is configured by the processor 61, the main memory 62, and the auxiliary storage device 63 and the system transmission line 613 that connects these devices.

The processor 61 is equivalent to a central part of the computer. The processor 61 controls the sections according to an operating system or application programs in order to realize various functions of the information terminal 60. The processor 61 is, for example, a Central Processing Unit (CPU).

The main memory 62 is equivalent to a main storage portion of the computer. The main memory 62 includes a nonvolatile memory region and a volatile memory region. The main memory 62 stores the operating system or the application programs in the nonvolatile memory region. The main memory 62 sometimes stores, in the nonvolatile or volatile memory region, data necessary for the processor 61 in executing processing for controlling the sections. The main memory 62 uses the volatile memory region as a work area where data is rewritten as appropriate by the processor 61. The nonvolatile memory region is, for example, a Read Only Memory (ROM). The volatile memory region is, for example, a Random Access Memory (RAM).

The auxiliary storage device 63 is equivalent to an auxiliary storage portion of the computer. For example, an Electric Erasable Programmable Read-Only Memory (EEPROM), a Hard Disk Drive (HDD), or a Solid State Drive (SSD) can be the auxiliary storage device 63. The auxiliary storage device 63 saves data used by the processor 61 in performing various kinds of processing, data created by the processing in the processor 61, or the like. The auxiliary storage device 63 sometimes stores the application programs.

The timer 64 clocks a set time according to the control by the processor 61. The wireless unit 65 performs wireless communication between the information terminal 60 and the access point 70 according to a wireless communication protocol.

The touch panel 66 is a device functioning as both of an input device and a display device of the information terminal 60. The touch panel 66 detects a touch position on a displayed image and outputs information concerning the touch position to the processor 61.

The scanner 67 reads a code symbol such as a barcode or a two-dimensional data code attached to a commodity. A code symbol representing a commodity code of the commodity is attached to the commodity. The scanner 67 outputs data of the read code symbol to the processor 61. The scanner 67 may be a type for reading the code symbol with scanning of a laser beam or may be a type for reading the code symbol from an image captured by an imaging device.

The reader 68 reads data recorded in a recording medium and outputs the read data to the processor 61. If the recording medium is a magnetic card, the reader 68 is a magnetic card reader. If the recording medium is a contact integrated circuit (IC) card, the reader 68 is an IC card reader. In the case of a recording medium in which Radio Frequency Identification (RFID) is used such as a noncontact IC card or a smartphone, an RFID reader is used as the reader 68.

The camera 69 is provided in the cart C to be able to photograph a basket placed on the basket receiving section of the cart C from above. The camera 69 is a camera for monitoring whether a customer, who is a user of the cart C, correctly puts purchased commodities in the basket.

The receiver 610 is a receiver capable of receiving a radio wave periodically transmitted from the transmitters 6 provided in the cart storage areas 5. As explained above, the transmitters 6 set the cart storage areas 5 and the vicinities around the cart storage areas 5 as the wireless communication areas. Therefore, the receiver 610 of the information terminal 60 provided in the cart C placed in the cart storage area 5 receives radio waves periodically transmitted from the transmitters 6. On the other hand, the receiver 610 of the information terminal 60 provided in the cart C taken out from the cart storage area 5 and, for example, carried into the store 3 cannot receives the radio waves transmitted from the transmitters 6.

The sensor 611 is a sensor for detecting a state in which the information terminal 60 provided in the cart C is left unattended. A specific example of the sensor 611 is explained below.

The lamp 612 is a lamp for informing a customer or a store clerk that the cart C is left unattended. For example, the lamp 612 is lit if the cart C is left unattended. For example, the lamp 612 flashes if the cart C is left unattended.

In the information terminal 60 including the circuit components explained above, the processor 61, the main memory 62, the auxiliary storage device 63, the timer 64, the wireless unit 65, and the touch panel 66 configure a tablet terminal TM. The information terminal 60 is configured by electrically connecting the scanner 67, the reader 68, the camera 69, the receiver 610, the sensor 611, and the lamp 612 to the tablet terminal TM.

Figure 5:
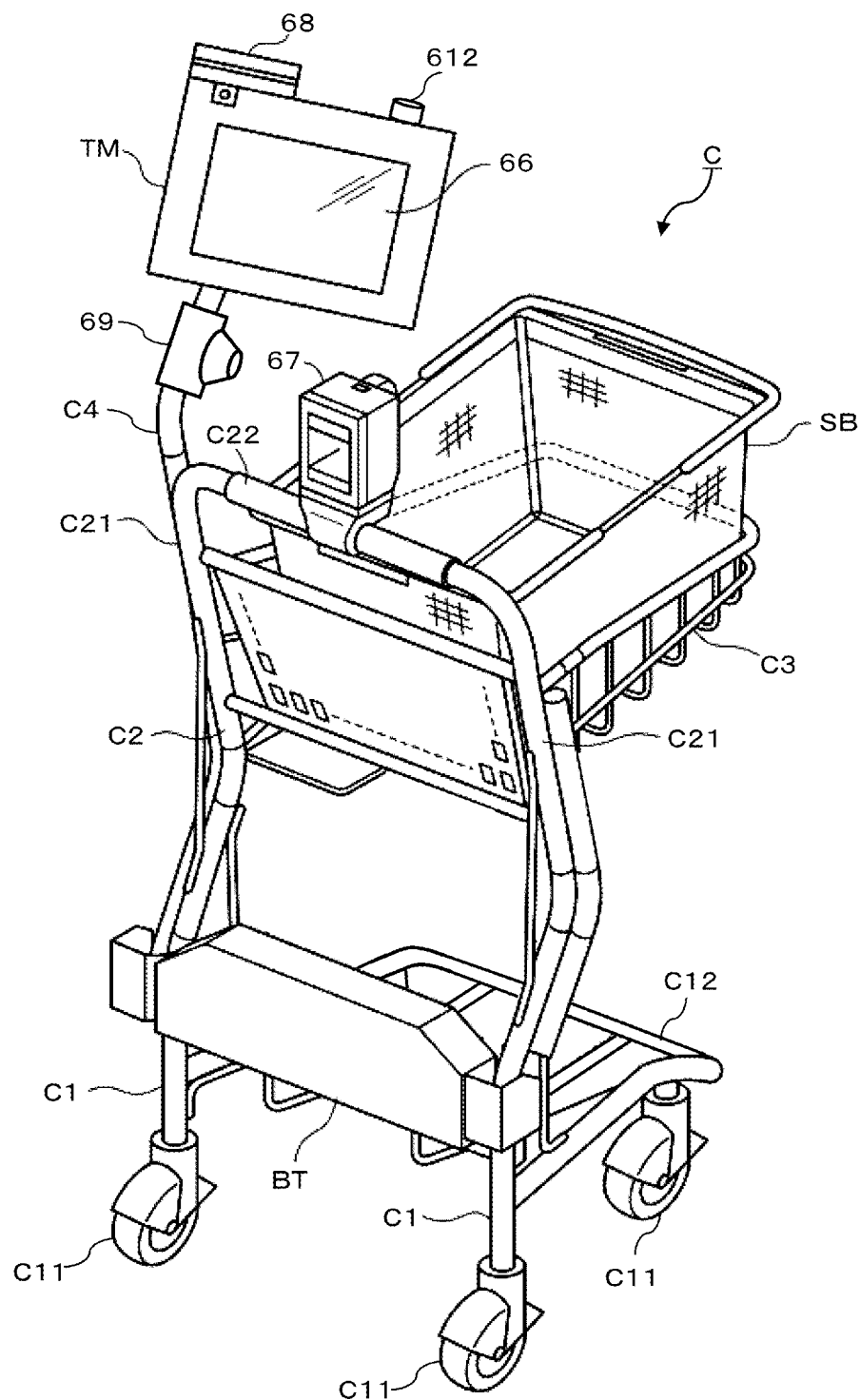
FIG. 5 is a perspective view illustrating an example of a cart in which the information terminal is provided.

FIG. 5 is a perspective view illustrating an example of the cart C in which the information terminal 60 is provided. The cart C includes a caster section C1 for movement, a handle frame section C2, and a basket receiving section C3. The caster section C1 includes four wheels C11 for smoothly moving the cart C on a floor surface. The caster section C1 includes a receiving section C12 for placing a large commodity that cannot be put in a shopping basket SB. The handle frame section C2 includes a pair of vertical frames C21 erected on a rear wheel side of the caster section C1 and a handlebar C22 that couples upper ends of the vertical frames C21. The basket receiving section C3 is present in the front of a part of the handle frame section C2. In the cart C, the shopping basket SB provided in the store can be placed on the basket receiving section C3. The shopping basket SB is a basket for storing commodities.

The scanner 67 is positioned along the handlebar C22. The scanner 67 is attached to the handlebar C22 such that a reading window is located on the near side. The near side is a side where a customer holding the handlebar C22 and pushing the cart C stands.

A pole C4 is attached to one of the vertical frames C21. The distal end of the pole C4 is located above the handlebar C22. The tablet terminal TM is attached to the distal end portion of the pole C4 with a screen of the touch panel 66 facing the near side. The reader 68 is attached to a frame of the tablet terminal TM such that a card slit is located on the near side. In FIG. 5, the reader 68 is a magnetic card reader. The camera 69 is attached to along the pole C4 to image the entire shopping basket SB placed on the basket receiving section C3 from above. Like the reader 68, the lamp 612 is provided on the frame of the tablet terminal TM. An attachment part of the lamp 612 is not limited to the frame of the tablet terminal TM. For example, the lamp 612 may be attached to a part of the pole C4. Alternatively, the lamp 612 may be attached to an upper part of the scanner 67.

A battery BT is attached between the vertical frames C21 on the lower end side of the handle frame section C2. The battery BT functions as a driving power supply for the tablet terminal TM, the scanner 67, the reader 68, and the camera 69.

Although not illustrated in FIG. 5, the receiver 610 and the sensor 611 are attached to the cart C. The receiver 610 is attached in a position where the receiver 610 is capable of receiving a radio wave transmitted from the transmitter 6 provided in the cart storage area 5 if the cart C is placed in the cart storage area 5. The receiver 610 may be attached to, for example, the battery BT. The receiver 610 may be incorporated in, for example, a case of the tablet terminal TM. An attachment place of the receiver 610 is not particularly limited. In short, the attachment place only has to be a place where the receiver 610 can receive a radio wave transmitted from the transmitter 6 provided in the cart storage area 5 if the cart C is placed in the cart storage area 5 and cannot receive the radio wave if the cart C is taken out from the cart storage area 5 and, for example, enters the store 3.

The sensor 611 may be, for example, a pressure sensor provided in the handlebar C22. The pressure sensor detects whether the handlebar C22 is gripped. If a customer grips the handlebar C22, pressure is applied to the handlebar C22. The pressure sensor detects the pressure. If the customer is gripping the handlebar C22, it can be surmised that the cart C is not left unattended. In other words, if the customer is not gripping the handlebar C22, it can be surmised that the cart C is left unattended. The pressure sensor is an example of a sensor that detects that the information terminal 60 provided in the cart C is left unattended. A temperature sensor that detects the temperature of a person gripping the handlebar C22 or a touch sensor that detects that a customer touches the handlebar C22 may be provided in the handlebar C22 instead of the pressure sensor.

The sensor 611 may be, for example, a vibration sensor provided in the receiving section C12. The vibration sensor detects whether the receiving section C12 is vibrating. If a customer pushes the cart C, the receiving section C12 vibrates in the vertical direction or the horizontal direction. The vibration sensor detects the vibration. If the cart C is pushed and the receiving section C12 is vibrating, it can be surmised that the cart C is not left unattended. In other words, if the cart C is not vibrating, it can be surmised that the cart C is left unattended. The vibration sensor is an example of a sensor that detects that the information terminal 60 provided in the cart C is left unattended. An attachment position of the vibration sensor is not limited to the receiving section C12. The attachment position only has to be a place where the vibration sensor can detect vibration of the cart C. Instead of the vibration sensor, an axle sensor that detects rotation of the wheel C11 may be provided in one or more of the wheels C11.

The number of sensors 611 provided in one cart C is not limited to one. A plurality of sensors 611 may be provided in the cart C to comprehensively detect from information of the sensors 611 that the information terminal 60 is left unattended.

Figure 6:
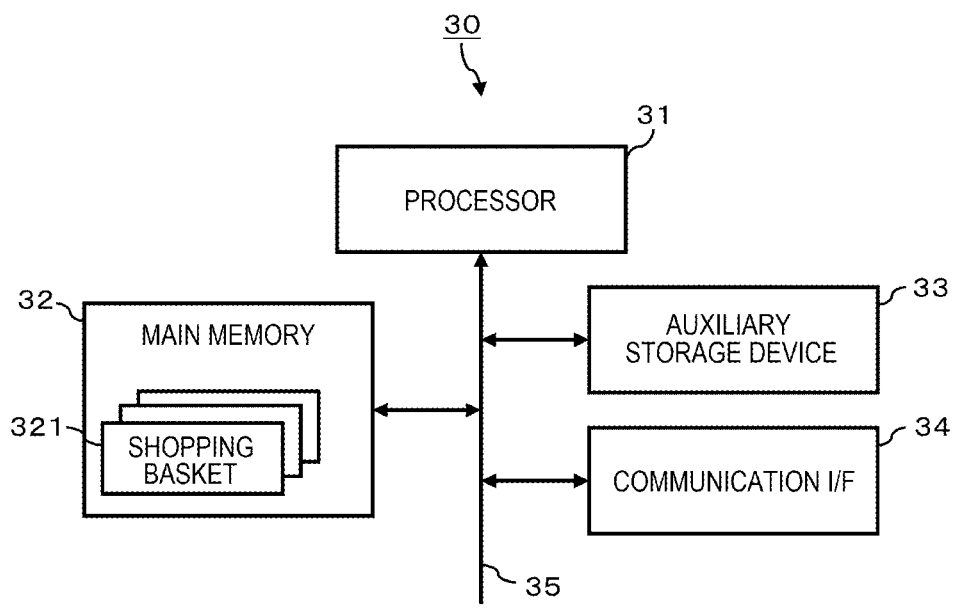
FIG. 6 is a block diagram illustrating a main part circuit configuration of a virtual POS server.

FIG. 6 is a block diagram illustrating a main part circuit configuration of the virtual POS server 30. The virtual POS server 30 includes a processor 31, a main memory 32, an auxiliary storage device 33, a communication interface 34, and a system transmission line 35. The system transmission line 35 includes an address bus, a data bus, and a control signal line. In the virtual POS server 30, the processor 31, the main memory 32, the auxiliary storage device 33, and the communication interface 34 are connected to the system transmission line 35. In the virtual POS server 30, a computer is configured by the processor 31, the main memory 32, and the auxiliary storage device 33 and the system transmission line 35 that connects these devices.

The processor 31 is equivalent to a central part of the computer. The processor 31 controls the sections according to an operating system or application programs in order to realize various functions of the virtual POS server 30. The processor 31 is, for example, a CPU.

The main memory 32 is equivalent to a main storage portion of the computer. The main memory 32 includes a nonvolatile memory region and a volatile memory region. The main memory 32 stores the operating system or the application programs in the nonvolatile memory region. The main memory 32 sometimes stores, in the nonvolatile or volatile memory region, data necessary for the processor 31 in executing processing for controlling the sections. The main memory 32 uses the volatile memory region as a work area where data is rewritten as appropriate by the processor 31. The nonvolatile memory region is, for example, a ROM. The volatile memory region is, for example, a RAM.

The auxiliary storage device 33 is equivalent to an auxiliary storage portion of the computer. For example, an EEPROM, a HDD, or an SSD can be the auxiliary storage device 33. The auxiliary storage device 33 saves data used by the processor 31 in performing various kinds of processing, data created by the processing in the processor 31, or the like. The auxiliary storage device 33 sometimes stores the application programs.

The communication interface 34 is connected to the network 2. The communication interface 34 performs, according to a communication protocol, data communication with other devices connected via the network 2.

In the virtual POS server 30 having such a configuration, a part of the volatile memory region of the main memory 32 is set as a creation region of a shopping basket memory 321. The virtual POS server 30 can create a plurality of shopping basket memories 321 in this region.

Figure 7:
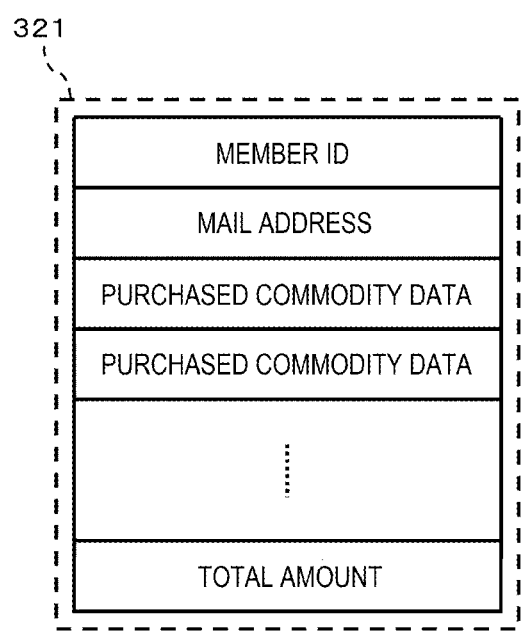
FIG. 7 is a schematic diagram illustrating an example of a shopping basket memory.

FIG. 7 is a schematic diagram illustrating an example of the shopping basket memory 321. As illustrated in FIG. 7, the shopping basket memory 321 includes regions for respectively storing a member ID, a mail address, one or a plurality of purchased commodity data, and a total amount. The purchased commodity data includes a commodity code, a commodity name, a unit price, the number of sold items, a sales amount, and a tax amount of a purchased commodity purchased by a customer. The total amount is a total of the sales amount and the tax amount included in the purchased commodity data.

Figure 8:
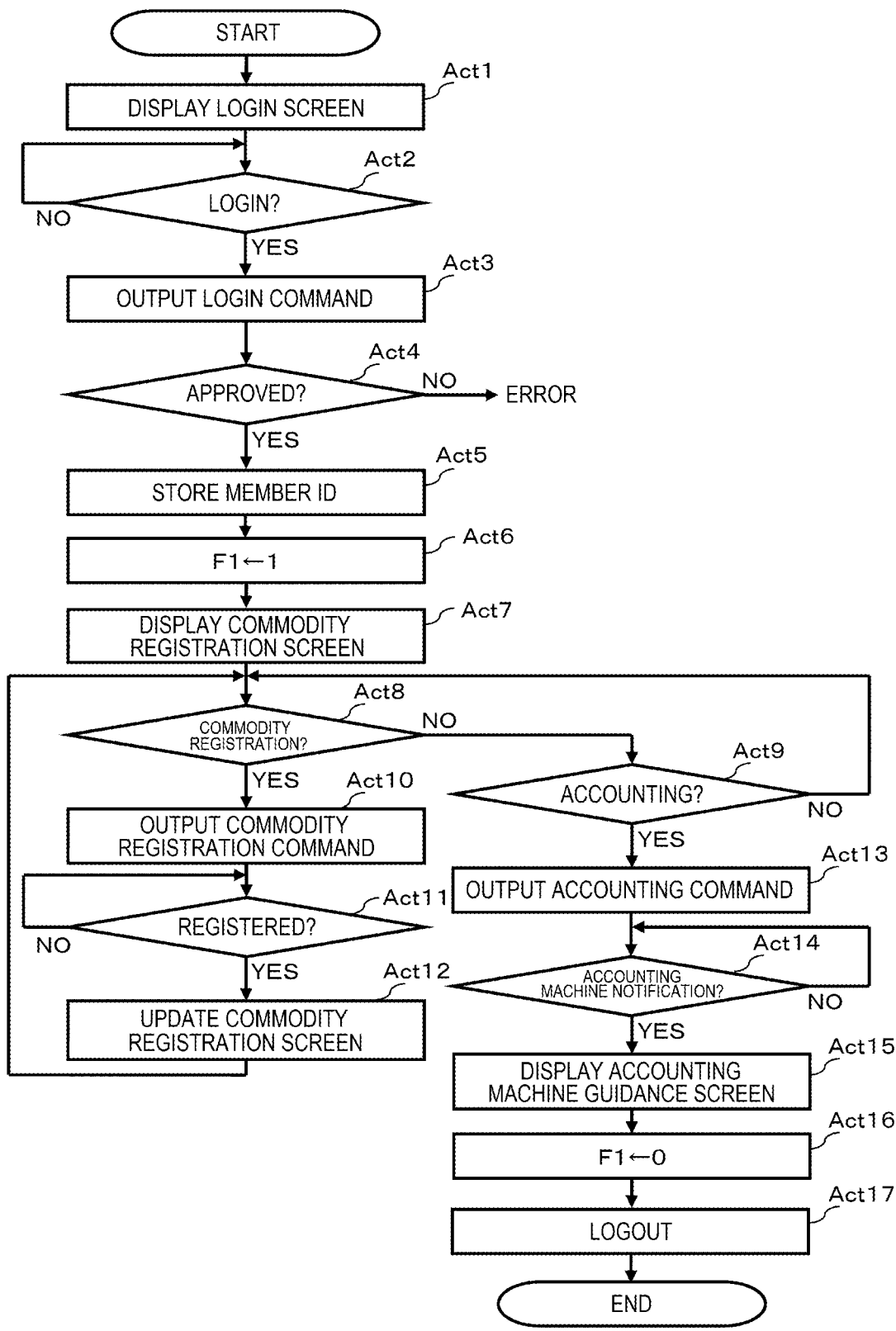
FIG. 8 is a flowchart illustrating a procedure of main information processing executed by a processor of the information terminal according to a terminal program.
Figure 9:
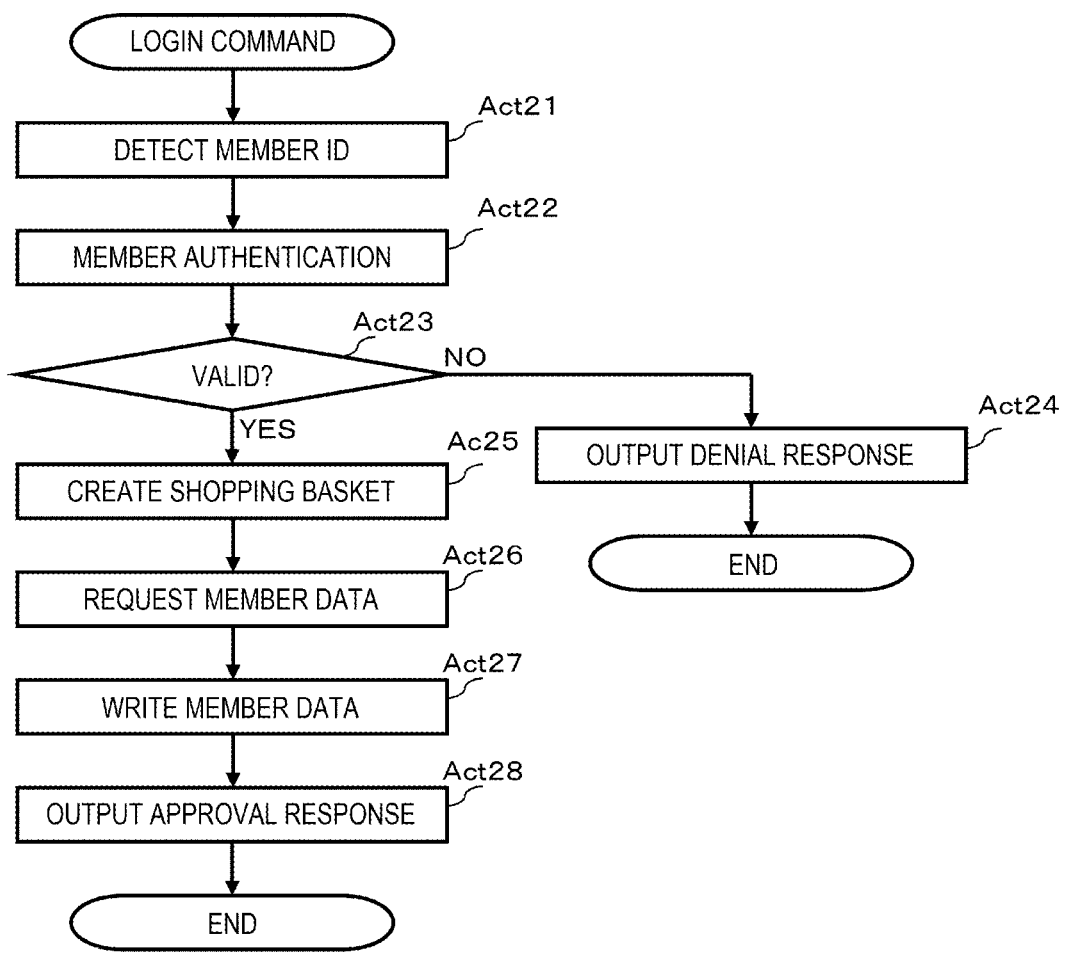
FIG. 9 is a flowchart illustrating a main part procedure of login command reception processing executed by a processor of the virtual POS server.
Figure 10:
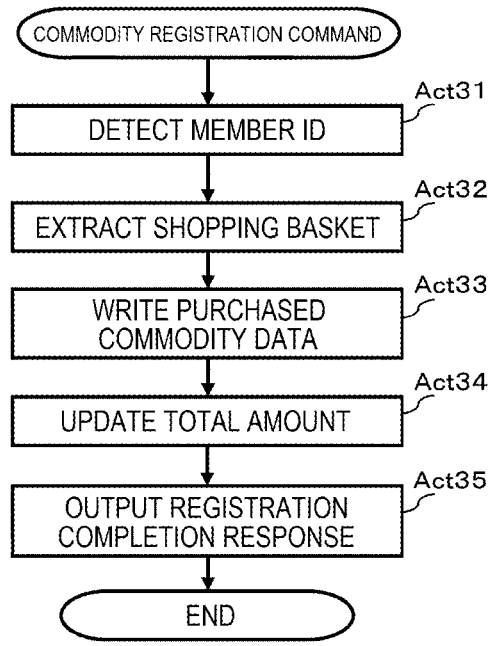
FIG. 10 is a flowchart illustrating a main part procedure of commodity registration command reception processing executed by the processor of the virtual POS server.
Figure 11:
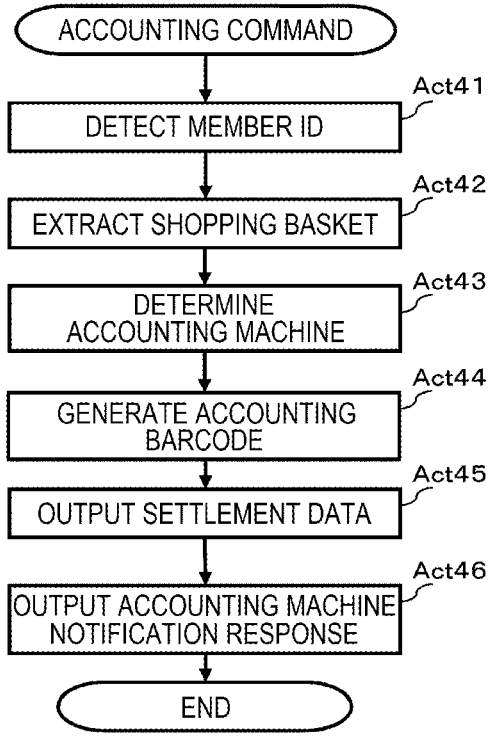
FIG. 11 is a flowchart illustrating a main part procedure of accounting command reception processing executed by the processor of the virtual POS server.

FIG. 8 is a flowchart illustrating a procedure of main information processing executed by the processor 61 of the information terminal 60 according to a terminal program. The terminal program is stored in the main memory 62 or the auxiliary storage device 63. FIGS. 9 to 11 are flowcharts illustrating a procedure of information processing executed by the processor 31 of the virtual POS server 30 according to reception of a main command transmitted from the information terminal 60. This procedure conforms to a control program. The control program is stored in the main memory 32 or the auxiliary storage device 33.

In the following explanation, a main operation of the cart POS system 1 from the time when a customer, who is a member, performs registration of a purchased commodity using the information terminal 60 provided in the cart C until the customer performs settlement in the accounting machine 50 is explained with reference to these flowcharts. The operation explained below is an example. A procedure of the operation is not particularly limited if the same result can be obtained.

First, a customer who performs shopping using the cart C touches the touch panel 66. If the touch panel 66 is touched, the processor 61 in an idle state starts. The processor 61 starts the information processing of the procedure illustrated in the flowchart of FIG. 8.

In Act 1, the processor 61 causes the touch panel 66 to display a login screen. The login screen is a screen for instructing a member to perform login operation. A customer, who is a member, owns a member card in which a member code of the customer is recorded. The customer, who confirms the login screen, causes the reader 68 to read data of the member card. If the data of the member card is read by the reader 68, the data of the member card is given to the processor 61.

In Act 2, the processor 61, which causes the touch panel 66 to display the login screen, is waiting for login. If receiving the data from the reader 68 and confirming that the data is data of a member card including a member ID, the processor 61 determines that login is performed. The processor 61 determines Yes in Act 2 and proceeds to Act 3.

In Act 3, the processor 61 controls the wireless unit 65 to output a login command to the virtual POS server 30. The wireless unit 65 wirelessly transmits the login command according to the control. The login command is received by the access point 70 and sent to the virtual POS server 30 through the network 2. The member ID of the member card read by the reader 68 is included in the login command.

If receiving a command from the information terminal 60 via the communication interface 34, the processor 31 of the virtual POS server 30 confirms a type of the command. If the received command is the login command, the processor 31 starts the procedure illustrated in the flowchart of FIG. 9.

In Act 21, the processor 31 detects the member ID from the login command. In Act 22, the processor 31 performs authentication of a member identified by the member ID. Specifically, the processor 31 inquires the member server 20 whether a member record including the member ID is present in the member database 21. As a result, if receiving, from the member server 20, a response indicating that the member record is present in the member dataset 21, the processor 31 acknowledges that the member authentication is valid. On the other hand, if receiving, from the member server 20, a response indicating that the member record is absent in the member database 21, the processor 31 acknowledges that the member authentication is invalid.

In Act 23, the processor 31, which performs the member authentication, confirms a result of the authentication. If the authentication result is invalid, the processor 31 determines NO in Act 23 and proceeds to Act 24. In Act 24, the processor 31 controls the communication interface 34 to output a denial response command to the information terminal 60. The communication interface 34 transmits the denial response command according to the control. The denial response command is wirelessly transmitted from the access point 70 via the network 2 and received by the information terminal 60 at a login command transmission source.

If the authentication result is valid, the processor 31 determines YES in Act 23 and proceeds to Act 25. In Act 25, the processor 31 forms the shopping basket memory 321 in the main memory 32. The processor 31 writes the member ID included in the login command in the shopping basket memory 321.

In Act 26, the processor 31 controls the communication interface 34 to request the member server 20 to transmit member data. The communication interface 34 transmits a request command for member data according to the control. The request command is received by the member server 20 via the network 2. The request command includes the member ID included in the login command.

The member server 20 detects, from the member database 21, the member record 21R in which the member ID included in the request command is described and transmits the member record 21R to the virtual POS server 30. The member record 21R is received by the communication interface 34 of the virtual POS server 30 via the network 2.

In Act 27, the processor 31 of the virtual POS server 30, which receives the member record 21R, writes data of the member record 21R in the shopping basket memory 321 in which the member ID included in the member record 21R is stored. The processor 31 writes a mail address of the member record 21R in the shopping basket memory 321.

Thereafter, in Act 28, the processor 31 controls the communication interface 34 to output an approval response command to the information terminal 60. The communication interface 34 transmits the approval response command according to the control. The approval response command is wirelessly transmitted from the access point 70 via the network 2 and received by the information terminal 60 at the login command transmission source.

In this way, the virtual POS server 30, which receives the login command, transmits the denial response command or the approval response command to the information terminal 60 at the login command transmission source. If finishing transmitting the response command, the processor 31 ends the command reception processing.

Referring back to FIG. 8, in Act 4, the processor 61 of the information terminal 60, which controls the output of the login command in Act 3, waits for a response command from the virtual POS server 30. If receiving the denial response command from the virtual POS server 30, the processor 61 determines NO in Act 4 and determines the login as an error.

If the login is the error, the customer, who is an operator of the information terminal 60, performs release operation for the error from the touch panel 66. If the release operation is performed, the processor 61 resume the processing from Act 1. Therefore, the customer performs the login again.

If receiving the approval response command from the virtual POS server 30, the processor 61 determines YES in Act 4 and proceeds to Act 5. In Act 5, the processor 61 stores the member ID included in the approval response command in the main memory 62. In Act 6, the processor 61 sets a login flag F1 to "1". The login flag F1 is one-bit information that is set to "1" if the customer performs login operation on the information terminal 60 and is reset to "O" if the customer performs accounting declaration.

After ending the processing in Acts 5 and 6, in Act 7, the processor 61 causes the touch panel 66 to display a commodity registration screen. The commodity registration screen is a screen for displaying a purchased commodity list of commodity names, prices, and the like and a total amount of commodities purchased by the customer.

The customer, who confirms the commodity registration screen, moves around the selling area and stores a commodity to be purchased, a so-called purchased commodity in the cart C. For example, the customer puts the purchased commodity in the shopping basket SB placed on the basket receiving section C3. Before putting the purchased commodity in the shopping basket SB, the customer operates the scanner 67 to read a code symbol attached to the commodity. If the code symbol is read by the scanner 67, a commodity code represented by the code symbol is input to the information terminal 60. The commodity identified by the commodity code is registered.

A code symbol is sometimes not attached to a part of commodities such as perishables. If a code symbol is not attached to the purchased commodity, the customer touches a commodity button corresponding to the purchased commodity among commodity buttons displayed on the touch panel 66. If the commodity button is touched, a commodity code of the commodity corresponding to the commodity button is input to the information terminal 60. The commodity identified by the commodity code is registered.

In Act 8, the processor 61 confirms whether commodity registration is performed. If the commodity registration is not performed, the processor 61 determines NO in Act 8 and proceeds to Act 9. In Act 9, the processor 61 confirms whether accounting is instructed.

An image of an accounting button is displayed in a part of the commodity registration screen. The customer, who finishes the shopping, touches the accounting button. If the accounting button is touched, the processor 61 recognizes that accounting is instructed. If accounting is not instructed, the processor 61 determines NO in Act 9 and returns to Act 8. In Acts 8 and 9, the processor 61 waits for commodity registration to be performed or accounting to be instructed.

If confirming that the commodity registration is performed in the waiting state, the processor 61 determines YES in Act 8 and proceeds to Act 10. In Act 10, the processor 61 controls the wireless unit 65 to output a commodity registration command to the virtual POS server 30. The wireless unit 65 wirelessly transmits the commodity registration command according to the control. The commodity registration command is received by the access point 70 and sent to the virtual POS server 30 via the network 2. The commodity registration command includes a member ID and a commodity code of a registered commodity stored in the main memory 62.

The processor 31 of the virtual POS server 30, which receives the commodity registration command, starts command reception processing of a procedure illustrated in the flowchart of FIG. 10. In Act 31, the processor 31 detects the member ID from the commodity registration command. In Act 32, the processor 31 extracts, as a processing target, the shopping basket memory 321 in which the member ID is described. In the following explanation, the processing target shopping basket memory 321 is referred to as shopping basket memory 321A.

After ending the processing in Acts 31 and 32, in Act 33, the processor 31 creates purchased commodity data based on the commodity code included in the commodity registration command and writes the purchased commodity data in the shopping basket memory 321A. In Act 34, the processor 31 adds a sales price and a tax amount of the purchased commodity data to the total amount of the shopping basket memory 321A.

After ending the processing in Acts 33 and 34, in Act 35, the processor 31 controls the communication interface 34 to output a registration completion response command to the information terminal 60. The communication interface 34 transmits the registration completion response command according to the control. The registration completion response command is wirelessly transmitted from the access point 70 via the network 2 and received by the information terminal 60 at a commodity registration command transmission source. The registration completion response command includes a purchased commodity list generated from the purchased commodity data stored in the shopping basket memory 321A and a total amount. After finishing transmitting the registration completion response command, the processor 31 ends the command reception processing.

Referring back to FIG. 8, in Act 11, the processor 61 of the information terminal 60, which controls the output of the commodity registration command in Act 10, waits for the registration completion response command. If receiving the registration completion response command from the virtual POS server 30, the processor 61 determines YES in Act 11 and proceeds to Act 12. In Act 12, the processor 61 updates the commodity registration screen displayed on the touch panel 66. The processor 61 updates the commodity registration screen such that the purchased commodity list and the total amount included in the registration completion response screen. Thereafter, the processor 61 returns to Act 8. The processor 61 returns to the waiting state in Acts 8 and 9. If confirming that commodity registration is performed again in the waiting state, the processor 61 executes the processing in Acts 10 to 12 in the same manner as explained above. Therefore, in the virtual POS server 30 as well, the processor 31 executes the reception processing for the commodity registration command illustrated in FIG. 10 again.

If detecting that the accounting button is touched in the waiting state in Acts 8 and 9, the processor 61 determines YES in Act 9 and proceeds to Act 13. In Act 13, the processor 61 controls the wireless unit 65 to output an accounting command to the virtual POS server 30. The wireless unit 65 wirelessly transmits the accounting command according to the control. The accounting command is received by the access point 70 and sent to the virtual POS server 30 via the network 2. The accounting command includes the member ID stored in the main memory 62.

The processor 31 of the virtual POS server 30, which receives the accounting command, starts command reception processing of the procedure illustrated in the flowchart of FIG. 11. In Act 41, the processor 31 detects the member ID from the accounting command. In Act 42, the processor 31 extracts, as a processing target, the shopping basket memory 321 in which the detected member ID is described. The processor 31 extracts the shopping basket memory 321A.

After ending the processing in Acts 41 and 42, in Act 43, the processor 31 determines the accounting machine 50 set as an accounting target with which the customer touching the accounting button performs accounting. For example, if any one accounting machine 50 among the three accounting machines 50 is not in use, the processor 31 determines the accounting machine 50 as an accounting target accounting machine. If two or more accounting machines 50 among the three accounting machines 50 are not in use, the processor 31 determines the accounting machines 50 not in use as the accounting target accounting machine according to a preset order. If all of the three accounting machines 50 are in use, the processor 31 determines the accounting machine 50 used first as the accounting target accounting machine.

If the accounting target accounting machine 50 is determined, in Act 44, the processor 31 generates data of an accounting barcode. The accounting barcode is a barcode for identifying a customer who performs accounting with the accounting machine 50. The accounting barcode is generated for each of customers who perform accounting with the accounting machines 50.

In Act 45, the processor 31 controls the communication interface 34 to output settlement data to the store server 10. The communication interface 34 transmits the settlement data via the network 2 according to the control. The settlement data is received by the store server 10 and stored in an internal memory of the store server 10. The settlement data includes the purchased commodity data and the total amount stored in the shopping basket memory 321A. The settlement data also includes data of an accounting machine identification code and an accounting barcode for specifying the accounting target accounting machine 50.

In Act 46, the processor 31 controls the communication interface 34 to output an accounting machine notification response command to the information terminal 60 at an accounting command transmission source. The communication interface 34 transmits the accounting machine notification response command according to the control. The accounting machine notification command is wirelessly transmitted from the access point 70 via the network 2 and received by the information terminal 60 at the accounting command transmission source. The accounting machine notification response command includes an accounting barcode.

Referring back to FIG. 8, in Act 14, the processor 61 of the information terminal 60, which controls the output of the accounting command in Act 13, waits for the accounting machine notification command. If receiving the accounting machine notification command in this waiting state, the processor 61 determines YES in Act 14 and proceeds to Act 15. In Act 15, the processor 61 causes the touch panel 66 to display an accounting machine guidance screen. The accounting machine identification code and the accounting barcode of the accounting target included in the accounting machine notification command are displayed on the accounting machine guidance screen.

The customer, who confirms the accounting machine guidance screen, moves to a setting place of the accounting machine 50 to which the accounting machine identification code is allocated and causes a scanner included in the accounting machine 50 to read the accounting barcode. Then, the accounting machine 50 acquires, from the store server 10, settlement data stored together with the accounting barcode. As a result, in the accounting machine 50, it is possible to execute, based on the settlement data, settlement processing such as cash payment, credit card payment, electronic money payment, and point payment.

In Act 16, the processor 61, which causes the touch panel 66 to display the accounting machine guidance screen, resets the login flag F1 to "0". Thereafter, in Act 17, the processor 61 performs logout. The member ID stored in the main memory 62 is cleared by the logout. The processor 61 ends the information processing of the procedure illustrated in the flowchart of FIG. 8.

Figure 12:
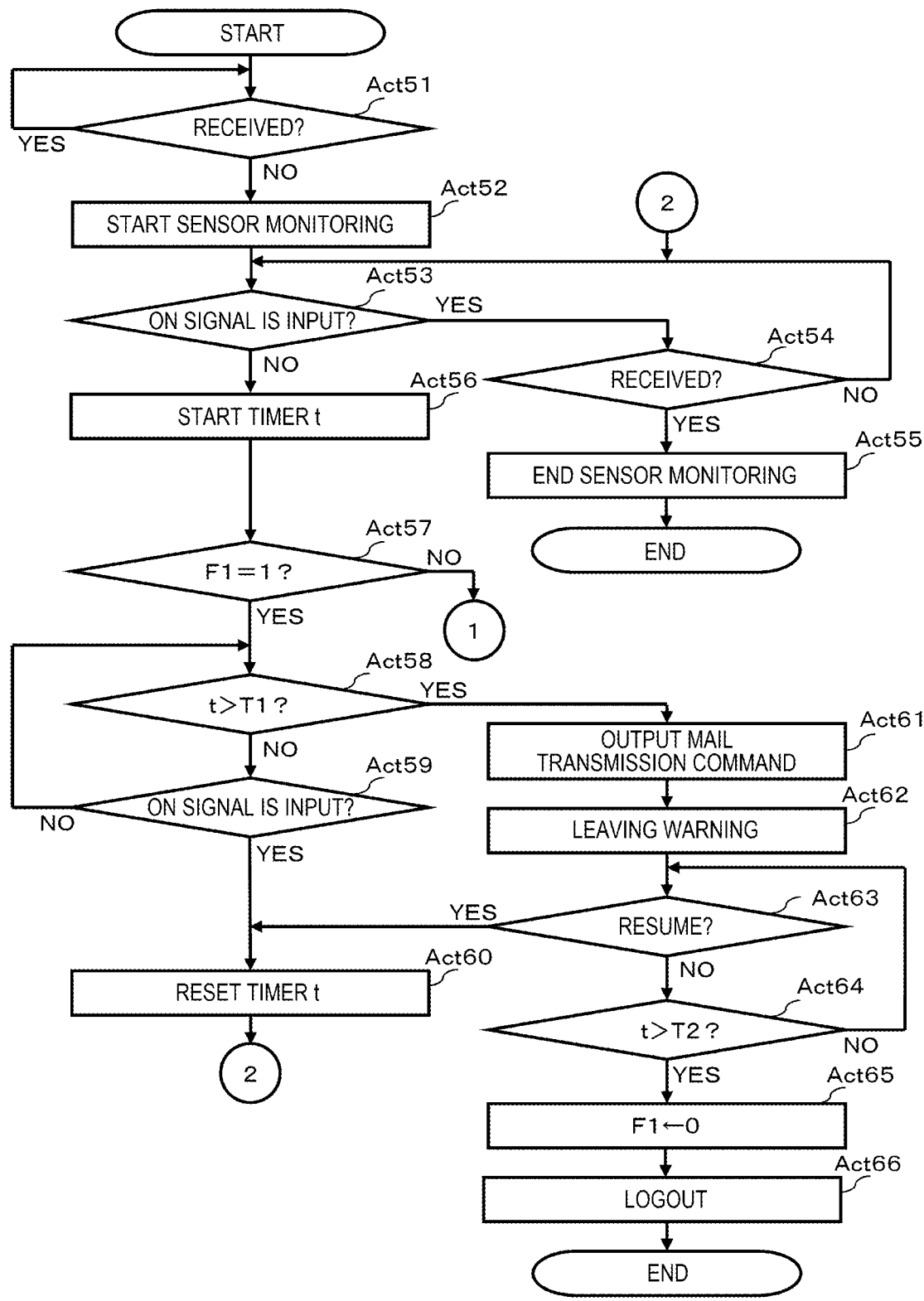
FIG. 12 is a flowchart illustrating a procedure of main information processing executed by the processor of the information terminal according to a monitoring program.
Figure 13:
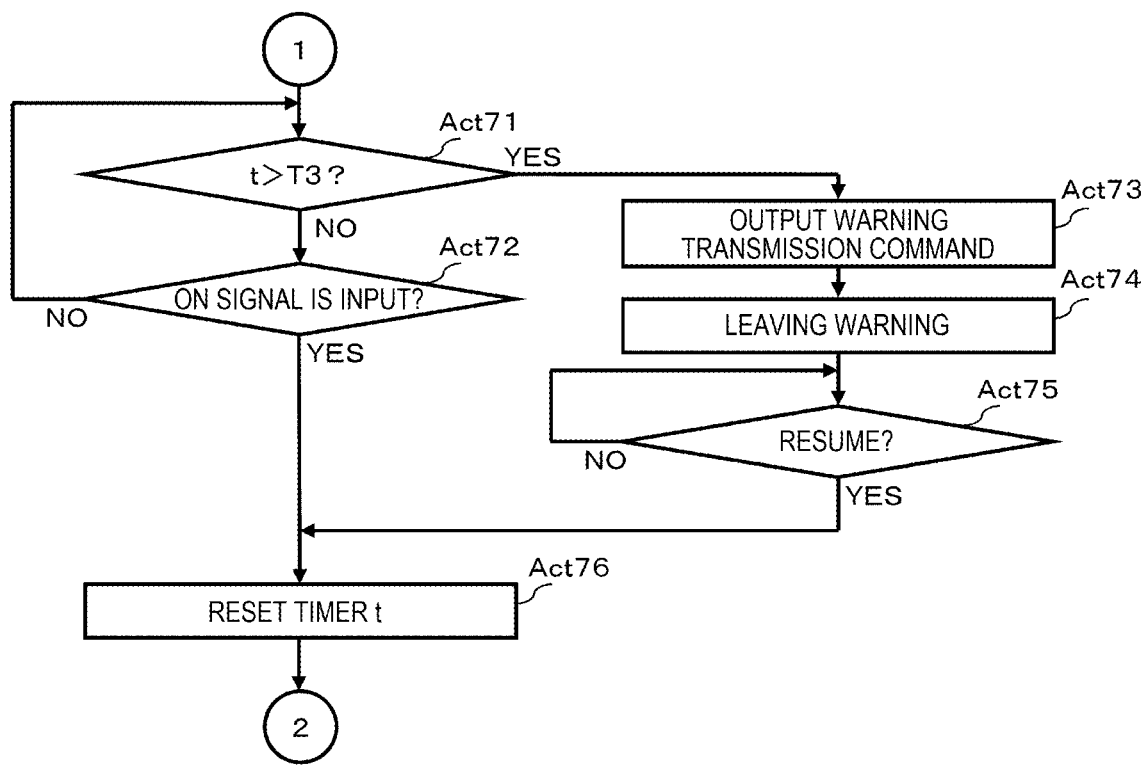
FIG. 13 is a flowchart illustrating the procedure of the main information processing executed by the processor of the information terminal according to the monitoring program.
Figure 14:
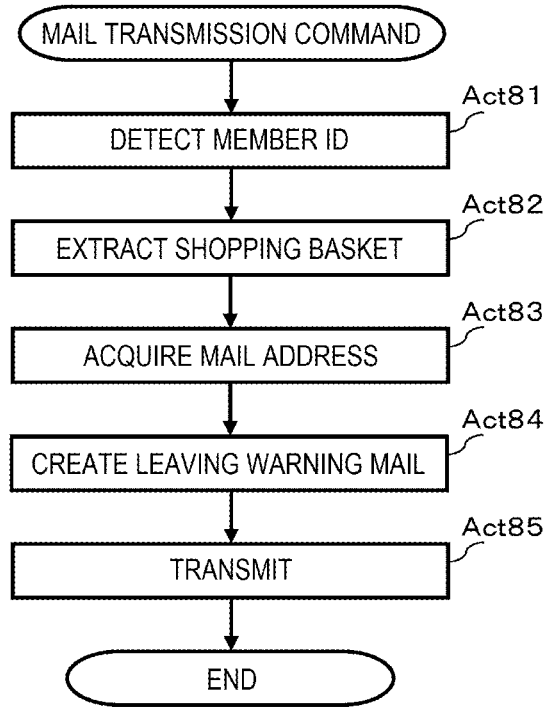
FIG. 14 is a flowchart illustrating a main part procedure of mail transmission command reception processing executed by the processor of the virtual POS server.
Figure 15:
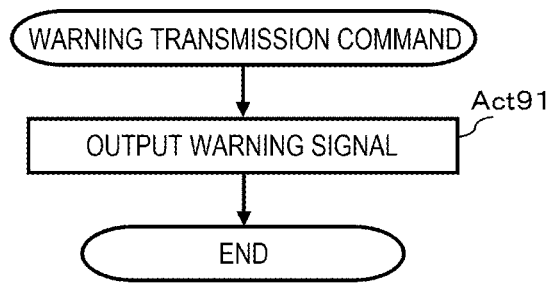
FIG. 15 is a flowchart illustrating a main part procedure of warning transmission command reception processing executed by the processor of the virtual POS server.

FIGS. 12 and 13 are flowcharts illustrating a procedure of main information processing executed by the processor 61 of the information terminal 60 according to a monitoring program. The monitoring program is stored in the main memory 62 or the auxiliary storage device 63. FIGS. 14 and 15 are flowcharts illustrating a procedure of information processing executed by the processor 31 of the virtual POS server 30 according to reception of a main command transmitted from the information terminal 60. This procedure conforms to a control program. The control program is stored in the main memory 32 or the auxiliary storage device 33.

The processor 61 of the information terminal 60 executes the information processing conforming to the monitoring program in cooperation with the processor 31 of the virtual POS server 30, whereby a function of a monitoring device that performs monitoring to prevent the information terminal 60 provided in the cart C from being left unattended as much as possible is realized. A main operation of the cart POS system 1 related to the function is explained below. The operation explained below is an example. A procedure of the operation is not particularly limited if the same result can be obtained.

If the monitoring program is started, the processor 61 starts the information processing of the procedure illustrated in the flowcharts of FIGS. 12 and 13. First, in Act 51, the processor 61 confirms whether the receiver 610 receives a radio wave periodically transmitted from the transmitter 6. If the radio wave is received, the processor 61 determines YES in Act 51 and returns to Act 51.

As explained above, if the cart C is placed in the cart storage area 5, the receiver 610 of the information terminal 60 provided in the cart C is capable of receiving a radio wave periodically transmitted from the transmitter 6 provided in the cart storage area 5. Therefore, the cart C can be regarded as being placed in the cart storage area 5 while the processor 61 determines YES in Act 51.

On the other hand, if the cart C is taken out by a customer and, for example, carried into the store 3, the receiver 610 cannot receive the radio wave from the transmitter 6. If the radio wave from the transmitter 6 cannot be received, the processor 61 determines NO in Act 51 and proceeds to Act 52. In Act 52, the processor 61 starts monitoring of a signal output from the sensor 611. For example, if the sensor 611 is the pressure sensor explained above, a gripping pressure of the handlebar C22 is detected and an ON signal is output from the sensor 611. Similarly, if the sensor 611 is the temperature sensor explained above, the temperature of a person holding the handlebar C22 is detected and an ON signal is output to the sensor 611. If the sensor 611 is the touch sensor explained above, it is detected that the person touches the handlebar C22 and an ON signal is output from the sensor 611. If the sensor 611 is the vibration sensor or the axel sensor explained above, vibration or rotation of a wheel caused by movement of the cart C is detected and an ON signal is output from the sensor 611.

In Act 53, the processor 61 confirms whether the ON signal is input from the sensor 611. If the ON signal is input, the processor 61 determines YES in Act 53 and proceeds to Act 54. In Act 54, the processor 61 confirms whether a radio wave from the transmitter 6 is received by the receiver 610. If the radio wave is not received, the processor 61 determines NO in Act 54 and returns to Act 53. In Acts 53 and 54, the processor 61 waits for the radio wave from the transmitter 6 to be received by the receiver 610 in a state in which the ON signal is input from the sensor 611 or waits for the ON signal from the sensor 611 to stop without the radio wave from the transmitter 6 being received by the receiver 610.

In the waiting state in Acts 53 and 54, if the receiver 610 receives the radio wave from the transmitter 6 in a state in which the ON signal is input from the sensor 611, the processor 61 determines YES in Act 54 and proceeds to Act 55. In Act 55, the processor 61 ends the monitoring of the signal output from the sensor 611.

If the cart C is pushed to the vicinity of the cart storage area 5 by a customer, a store clerk, or the like, in the information terminal 60 of the cart C, the receiver 610 receives a radio wave transmitted from the transmitter 6 set in the cart storage area 5 in a state in which the ON signal is output from the sensor 611. Therefore, the receiver 610 receiving the radio wave from the transmitter 6 means that the cart C is returned to the cart storage area 5. Therefore, the processor 61 ends the information processing.

On the other hand, if the customer pushing the cart C in the store 3 takes the hand off the handlebar C22, the ON signal is not output from the sensor 611 anymore. If the ON signal stops, the processor 61 determines NO in Act 53 and proceeds to Act 56. In Act 56, the processor 61 starts the timer 64. In Act 57, the processor 61 checks the login flag F1. If the login flag F1 is set to "1", it is assumed that the cart C present in the selling area 3A is a processing target. In this case, the processor 61 determines YES in Act 57 and proceeds to Act 58. In Act 58, the processor 61 confirms whether a count value t of the timer 64 exceeds a first leaving determination time T1.

The first leaving determination time T1 is a time for determining whether the cart C is in a left state in the selling area 3A. Various events are conceivable as an event in which the customer takes the hand off the cart C. For example, the customer is considered to take the hand off the cart C if the customer is evaluating commodities in a commodity shelf. For example, the customer is considered to take the hand off the cart C if the customer operates a smartphone. However, in both the cases, the customer is often present beside the cart C. In that case, the customer is surmised to move the cart C again within a relatively short time, for example, one minute. On the other hand, if the customer moves away from the selling area 3A while leaving the cart C unattended, the customer does not always return in a short time. Therefore, in this embodiment, the first leaving determination time T1 is set to one minute. The first leaving determination time T1 is not limited to one minute and can be optionally set.

If the count value t does not exceed the first leaving determination time T1, the processor 61 determines NO in Act 58 and proceeds to Act 59. In Act 59, the processor 61 confirms whether the ON signal is input from the sensor 611. If the ON signal is not input, the processor 61 determines NO in Act 59 and returns to Act 58. In Acts 58 and 59, the processor 61 waits for the count value t to exceed the first leaving determination time T1 or the ON signal to be input from the sensor 611.

If the cart C is moved and the ON signal is input from the sensor 611 before the count value t exceeds the first leaving determination time T1, the processor 61 determines YES in Act 59 and proceeds to Act 60. In Act 60, the processor 61 resets the timer 64. Thereafter, the processor 61 returns to the waiting state in Acts 53 and 54.

On the other hand, if the count value t exceeds the first leaving determination time T1 without the ON signal being input from the sensor 611, the processor 61 determines YES in Act 58 and proceeds to Act 61. In Act 61, the processor 61 controls the wireless unit 65 to output a mail transmission command to the virtual POS server 30. The wireless unit 65 wirelessly transmits the mail transmission command according to the control. The mail transmission command is received by the access point 70 and sent to the virtual POS server 30 through the network 2. The mail transmission command includes the member ID stored in the memory 62.

If receiving a command from the information terminal 60 via the communication interface 34, the processor 31 of the virtual POS server 30 confirms a type of the command. If the received command is the mail transmission command, the processor 31 executes the information processing of the procedure illustrated in the flowchart of FIG. 14. This procedure conforms to a control program. However, operation explained below is an example. The procedure is not particularly limited if the same result can be obtained.

In Act 81, the processor 31 detects the member ID from the main transmission command. In Act 82, the processor 31 extracts, as a processing target, the shopping basket memory 321 in which the detected member ID is described. The processor 31 extracts the shopping basket memory 321A.

After ending the processing in Acts 81 and 82, in Act 83, the processor 31 acquires a mail address from the shopping basket memory 321A. In Act 84, the processor 31 creates a leaving warning mail with the mail address set as a destination. The leaving warning mail includes a text of content for warning that the cart C used by the customer is in a left state. The processor 31 controls the communication interface 34 to transmit the leaving warning mail. The communication interface 34 sends data of the leaving warning mail to the store server 10 via the network 2 according to the control. The store server 10 transmits the leaving warning mail with a function of a mail server.

Figure 16:
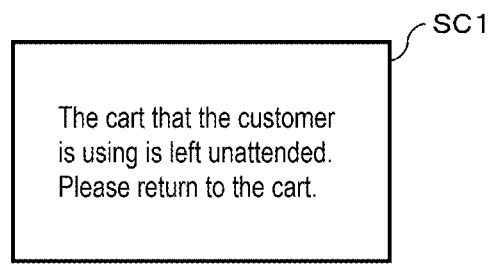
FIG. 16 is a schematic diagram illustrating an example of a message image displayed on a display device of a wireless communication terminal such as a smartphone.

The leaving warning mail transmitted from the store server 10 in this way is received by a communication terminal specified by the mail address of the leaving warning mail, that is, a wireless communication terminal such as a smartphone carried by a customer who logs in to the information terminal 60 of the cart C left unattended. For example, a message image SC1 of content illustrated in FIG. 16 is displayed on a display of the wireless communication terminal. Therefore, since the leaving warning mail is transmitted to a smartphone or the like carried by a customer who leaves the cart C unattended for a time exceeding the first leaving determination time T1, it is possible to warn the customer that the cart C is left unattended.

Figure 17:
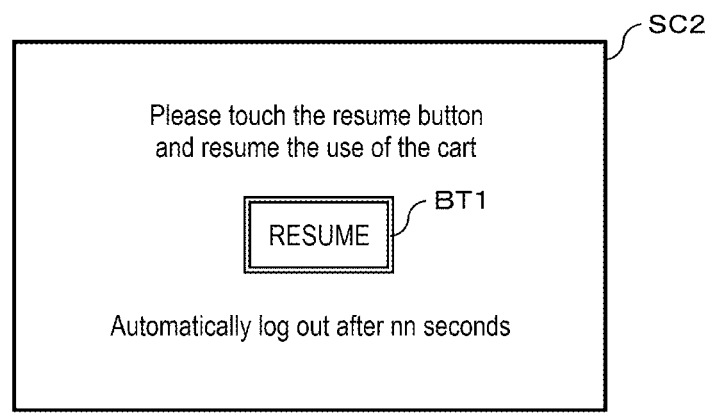
FIG. 17 is a schematic diagram illustrating an example of a warning image displayed on a touch panel of the information terminal.

Referring back to FIG. 12, in Act 62, the processor 61, which controls the output of the mail transmission command in Act 61, executes processing of leaving warning. The processing includes processing for lighting the lamp 612 or causing the lamp 612 to flash. The processing also includes processing for displaying, on the touch panel 66, a warning image SC2 of content illustrated in FIG. 17. The warning image SC2 includes an image of a resume button BT1. Therefore, the customer, who confirms the leaving warning mail and returns to the place where the cart C is left unattended, touches the resume button BT1 according to the warning image SC2. At this time, since the lamp 612 provided in the cart C is lit or flashing, the customer can easily find a place where the cart C left unattended by the customer is present. Moreover, since the lamp 612 is lit or flashes, a customer about to illegally use the cart C in the left state can be restrained from doing so.

Referring back to FIG. 12, in Act 63, the processor 61, which performs the processing of the leaving warning in Act 62, confirms whether the resume button BT1 is touched. If the resume button BT1 is not touched, the processor 61 determines NO in Act 63 and proceeds to Act 64. In Act 64, the processor 61 confirms whether the count value t of the timer 64 exceeds a logout setting time T2.

If the first leaving determination time T1 elapses after the start of the timer 64 and the leaving warning mail is transmitted but the customer does not immediately return, a risk of the information terminal 60 of the cart C being illegally used by an outside increases. In this case, it is desirable to make the information terminal 60 unusable. Therefore, in this case, the logout setting time T2 is set to two minutes longer than the first leaving determination time T1. The logout setting time T2 is not limited to two minutes and can be optionally set if the logout setting time T2 is a time longer than the first leaving determination time T1.

If the count value t does not exceed the logout setting time T2, the processor 61 determines NO in Act 64 and returns to Act 63. In Acts 63 and 64, the processor 61 waits for the resume button BT1 to be touched or the count value t to exceed the logout setting time T2.

If the resume button BT1 is touched before the count value t exceeds the logout setting time T2, the processor 61 determines YES in Act 63 and proceeds to Act 60. The processor 61 resets the timer 64 and returns to the waiting state in Acts 53 and 54.

On the other hand, if the count value t exceeds the logout setting time T2 without the resume button BT1 being touched, the processor 61 determines YES in Act 64 and proceeds to Act 65. In Act 65, the processor 61 resets the login flag F1 to "0". Thereafter, the processor 61 performs logout in Act 66. The processor 61 ends the information processing.

If the logout is performed, the login screen is displayed on the touch panel 66 of the information terminal 60. Therefore, the customer returning to the place where the cart C is left unattended and resuming the use of the cart C resumes the shopping from the login operation on the information terminal 60.

If the login flag F1 is "0" in Act 57, it is assumed that the cart C present in the accounting area 3B or a place away from the cart storage area 5 outside the store 3 is a processing target. In this case, the processor 61 determines NO in Act 57 and proceeds to Act 71 in FIG. 13. In Act 71, the processor 61 confirms whether the count value t of the timer 64 exceeds a second leaving determination time T3.

The second leaving determination time T3 is a time for determining whether the cart C is in a left state in the accounting area 3B or a place away from the cart storage areas 5 outside the store 3. As an event in which the customer takes their hand off the cart C in the accounting area 3B, there is packing work. Most customers return the carts C to the cart storage areas 5 and go home after finishing the packing work. However, some customers go home while leaving the carts C in the accounting area 3B after finishing the packing work. Some customers leave the carts C unattended in places different from the cart storage areas 5, for example, a parking lot. In this embodiment, store clerks are warned about the carts C left unattended after the customers go home. The store clerks return the carts C to the cart storage areas 5. Therefore, the second leaving determination time T3 is set to a time necessary for the packing work of the customer, for example, three minutes. The second leaving determination time T3 is not limited to three minute and can be optionally set.

If the count value t does not exceed the second leaving determination time T3, the processor 61 determines NO in Act 71 and proceeds to Act 72. In Act 72, the processor 61 confirms whether the ON signal is input from the sensor 611. If the ON signal is not input, the processor 61 determines NO in Act 72 and returns to Act 71. In Acts 71 and 72, the processor 61 waits for the count value t to exceed the second leaving determination time T3 or the ON signal to be input from the sensor 611.

If the cart C is moved and the ON signal is input from the sensor 611 before the count value t exceeds the second leaving determination time T3, the processor 61 determines YES in Act 72 and proceeds to Act 76. In Act 76, the processor 61 resets the timer 64. Thereafter, the processor 61 returns to the waiting state in Acts 53 and 54 in FIG. 12. Therefore, if the cart C is returned to the cart storage area 5, the monitoring processing for the signal output from the sensor 611 ends.

On the other hand, if the count value t exceeds the second leaving determination time T3 without the ON signal being input from the sensor 611, the processor 61 determines YES in Act 71 and proceeds to Act 73. In Act 73, the processor 61 controls the wireless unit 65 to output a warning transmission command to the virtual POS server 30. The wireless unit 65 wirelessly transmits the warning transmission command according to the control. The warning transmission command is received by the access point 70 and sent to the virtual POS server 30 through the network 2.

If receiving a command from the information terminal 60 via the communication interface 34, the processor 31 of the virtual POS server 30 confirms a type of the command. If the received command is the warning transmission command, the processor 31 executes the information processing of the procedure illustrated in the flowchart of FIG. 15. This procedure conforms to a control program. However, operation explained below is an example. The procedure is not particularly limited if the same result can be obtained.

Figure 18:
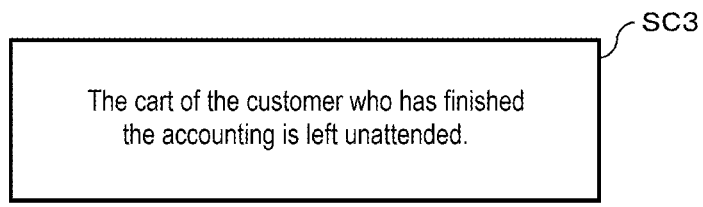
FIG. 18 is a schematic diagram illustrating an example of a message image displayed on a display device of an attendant terminal.

In Act 91, the processor 31 controls the communication interface 34 to transmit a warning signal to the attendant terminal 40. The communication interface 34 sends the warning signal to the attendant terminal 40 via the network 2 according to the control. For example, as illustrated in FIG. 18, the attendant terminal 40 displays, on the display device, a message image SC3 for notifying a store clerk that the cart C used by a customer, who ends accounting, is left unattended. Therefore, the store clerk can learn from the message image SC3 that the cart C used by the customer, who ends the accounting, is left unattended in the accounting area 3B or a place away from the cart storage areas 5 outside the store 3.

Referring back to FIG. 13, in Act 74, the processor 61, which controls the output of the warning transmission command in Act 73, executes processing of leaving warning. This processing is the same as the processing explained in Act 62 in FIG. 12. In Act 75, the processor 61, which performs the processing of the leaving warning, waits for the resume button BT1 to be touched. If the resume button BT1 is touched, the processor 61 determines YES in Act 75 and proceeds to Act 76. The processor 61 resets the timer 64 and returns to the waiting state in Acts 53 and 54.

Therefore, the store clerk, who confirms the message image SC3 displayed on the display device of the attendant terminal 40, searches for the cart C left unattended in the accounting area 3B or on the outside of the store 3. At this time, since the lamp 612 is lit or flashing in the cart C left unattended, the store clerk can easily find out the cart C left unattended. If the store clerk finds out the cart C left unattended, the store clerk only has to touch the resume button BT1 and return the cart C to the cart storage area 5. Consequently, in the information terminal 60, the monitoring processing for the signal output from the sensor 611 ends.

As it is evident from the above explanation, the computer including the processor 61 of the information terminal 60 as the central part configures a determining section that executes the processing in Acts 51 and 54 in FIG. 12 in cooperation with the receiver 610 to thereby determine whether the information terminal 60, which moves together with a purchaser and receives data input of a commodity purchased by the purchaser, is present in a second place different from a set first place, that is, the cart storage areas 5.

The computer including the processor 61 of the information terminal 60 as the central part configures a detecting section that executes the processing in Acts 52, 53, 56, and 59 in FIG. 12 and Acts 71 and 72 in FIG. 13 in cooperation with the timer 64 and the sensor 611 to thereby detect that the information terminal 60 is left unattended in the second place.

The computer configures an alarm section that executes the processing in Acts 61 and 62 in FIG. 12 and Acts 73 and 74 in FIG. 13 in cooperation with the wireless unit 65 and the lamp 612 to thereby emit an alarm if the information terminal 60 is left unattended in the second place.

With such a configuration, according to this embodiment, it is possible to prevent the cart C and the information terminal 60 provided in the cart C from being left unattended in a place different from the art storage areas 5 as much as possible.

Further, the computer configures a control section that executes the processing in Acts 64 to 66 in FIG. 12 in cooperation with the timer 64 to thereby prevent the information terminal 60 from receiving data input of commodities if a fixed time elapses while the information terminal 60 is left unattended in the second place.

With such a configuration, according to this embodiment, it is possible to prevent the information terminal 60 of the cart C left unattended in the selling area 3A or the like from being illegally used by an outsider as much as possible.

The information terminal 60 further receives an accounting instruction for commodities purchased by the purchaser. The information terminal 60 changes, in the detecting section, before and after the accounting instruction is received, a time until the information terminal 60 is regarded as being left unattended. Specifically, the information terminal 60 sets a determination time before the reception of the accounting instruction to the first leaving determination time T1 and sets a determination time after the reception of the accounting instruction to the second leaving determination time T3.

As an event in which the customer leaves the cart C unattended before the accounting instruction is received, there is evaluation or the like of commodities. A time required for this work is considered to be approximately one minute. On the other hand, as an event in which the customer leaves the cart C unattended after the accounting instruction is received, there is packing work. Approximately three minutes are necessary for this work. According to this embodiment, it is possible to reduce misdetections because the time until the cart C is regarded as being left unattended before the accounting instruction is received and the time until the cart C is regarded as being left unattended after the accounting instruction is received are changed.

Moreover, in this embodiment, before the accounting instruction is received, a leaving warning mail is transmitted to a wireless communication terminal such as a smartphone carried by the customer. On the other hand, after the accounting instruction is received, a warning image is displayed on the attendant terminal 40. Since a form of an alarm is differentiated before and after the accounting instruction is received. Therefore, it is possible to perform an accurate warning. Specifically, since a warning is given to the customer before the accounting instruction is received, the customer can quickly return to a place where the cart C is left unattended and resume work. On the other hand, after the accounting instruction is received, since a warning is given to the store clerk, the store clerk can quickly return the cart C to the cart storage area 5. Consequently, likelihood that the information terminal 60 provided in the cart C is left unattended for a long time is extremely small.

The embodiment of the monitoring device that can prevent the information terminal from being left unattended as much as possible is explained above. However, such an embodiment is not limited to this.

In the embodiment, the information terminal 60 is explained as outputting the mail transmission command to the virtual POS server 30 and the processor 31 of the virtual POS server 30 is explained as performing the information processing of the procedure illustrated in the flowchart of FIG. 14. Concerning this point, the information terminal 60 may output the mail transmission command to the store server 10 and a processor of the store server 10 may execute the information processing of the procedure illustrated in the flowchart of FIG. 14.

Similarly, the information terminal 60 may output the warning transmission command to the store server 10 and the processor of the store server 10 may execute the information processing of the procedure illustrated in the flowchart of FIG. 15. The information terminal 60 may output the warning transmission command to the attendant terminal 40. In this case, a processor of the attendant terminal 40, which receives the warning transmission command, displays the message image SC3 on the display device.

The processor 61 of the information terminal 60 may execute the processing of the procedure illustrated in the flowcharts of FIGS. 14 and 15.

In the embodiment, the transmitter 6 is provided in the cart storage area 5 and the receiver 610 is provided in the information terminal 60. If the receiver 610 is receiving a radio wave from the transmitter 6, it is determined that the cart C, to which the information terminal 60 is attached, is located in the cart storage area 5. The determining method is not limited to this. For example, magnetism may be generated from a grounding surface of the cart storage area 5. It may be determined, according to whether the magnetism is detected by a magnetic sensor attached to the cart C, whether the cart C is placed in the cart storage area 5.

In this embodiment, the sensor 611 is used to detect a state in which the information terminal 60 provided in the cart C is left unattended. The camera 69 may be use instead of or in addition to the sensor 611. In this case, the camera 69 photographs a region including the handlebar C22. The processor 61 may process an image photographed by the camera 69 and detect, according to whether a person gripping the handlebar C22 is photographed, whether the cart C is left unattended.

In the embodiment, as the example, the login to the information terminal 60 is performed using the member card. However, a method of the login is not particularly limited. A code symbol indicating a member code may be displayed on a display of a smartphone carried by the customer. The login may be performed by causing the scanner 67 to read the code symbol. In this case, the reader 68 may be omitted from the information terminal 60.

In the embodiment, the first leaving determination time T1 is set to the time shorter than the second leaving determination time T3. Concerning this point, the first leaving determination time T1 may be longer than the second leaving determination time T3. The first leaving determination time T1 and the second leaving determination time T3 may be equal.

In the embodiment, as the example, in the cart POS system 1, the function of the monitoring device is applied to the information terminal 60 provided in the cart C. An information terminal to which the function of the monitoring device is applied is not limited to this. The same function of the monitoring device may be applied to, for example, an information terminal carried and used by the customer rather than being provided in the cart C.

The cart POS system 1 is not limited to the cart POS system illustrated in FIG. 1. For example, the store server 10, the member server 20, and the virtual POS server 30 may be configured by one or two servers. For example, the member server 20 may be provided on the Internet as cloud computing rather than being directly connected to the network 2.

In the embodiment, the monitoring program is explained as being stored in advance in the main memory 62 or the auxiliary storage device 63 of the information terminal 60. Concerning this point, the monitoring program transferred separately from the information terminal 60 may be written in a writable storage device included in the information terminal 60 according to user operation. The transfer of the monitoring program can be performed by recording the monitoring program in a removable recording medium or can be performed by communication via a network. A form of the recording medium may be any form if, like a CD-ROM, a memory card, or the like, the recording medium can store a computer program and can be read by a device.

The several embodiments are explained above. However, the embodiments are presented as examples and are not intended to limit the scope of the invention. These new embodiments can be implemented in other various forms. Various omissions, substitutions, and changes can be made without departing from the spirit of the invention. These embodiments and modifications of the embodiments are included in the scope and the gist of the invention and included in the inventions described in claims and the scope of equivalents of the inventions.

What is claimed is:

1. A monitoring device comprising:
   one or more processors having programmed instructions to:
   determine whether an information terminal is present in a second place different from a set first place, the information terminal moving together with a purchaser and receiving data input regarding commodities for purchase by the purchaser;
   detect that the information terminal is left unattended in the second place;
   activate an alarm in response to the information terminal being left unattended in the second place for a threshold period of time; and
   in connection with the detection that the information terminal is left unattended in the second place, change, before and after an accounting instruction is received by the information terminal regarding the commodities for purchase by the purchaser, the threshold period of time until the information terminal is regarded as being left unattended.

2. The monitoring device of claim 1, wherein the one or more processors have programmed instructions to differentiate a form of the alarm before and after the accounting instruction is received.

3. The monitoring device of claim 1, wherein the one or more processors have programmed instructions to provide the alarm to the purchaser before the accounting instruction is received and to provide the alarm to a store clerk after the accounting instruction is received.

4. A monitoring method comprising:
   determining, by a computer processor, whether an information terminal is present in a second place different from a set first place, the information terminal moving together with a purchaser and receiving data input regarding commodities for purchase by the purchaser;
   detecting, by the computer processor, that the information terminal is left unattended in the second place;
   emitting, by the computer processor, an alarm in response to the information terminal being left unattended in the second place for a threshold period of time;
   receiving, by the information terminal, an accounting instruction regarding the commodities for purchase by the purchaser; and
   in connection with the detection that the information terminal is left unattended in the second place, changing, before and after the accounting instruction is received, the threshold period of time until the information terminal is regarded as being left unattended.

5. The monitoring method of claim 4, further comprising differentiating a form of the alarm before and after the accounting instruction is received.

6. The monitoring method of claim 4, further comprising providing the alarm to the purchaser before the accounting instruction is received and providing the alarm to a store clerk after the accounting instruction is received.

* * * * *